C. ELLIS.
MAKING GAS OIL.
APPLICATION FILED MAY 29, 1913.
1,341,975.
Patented June 1, 1920.
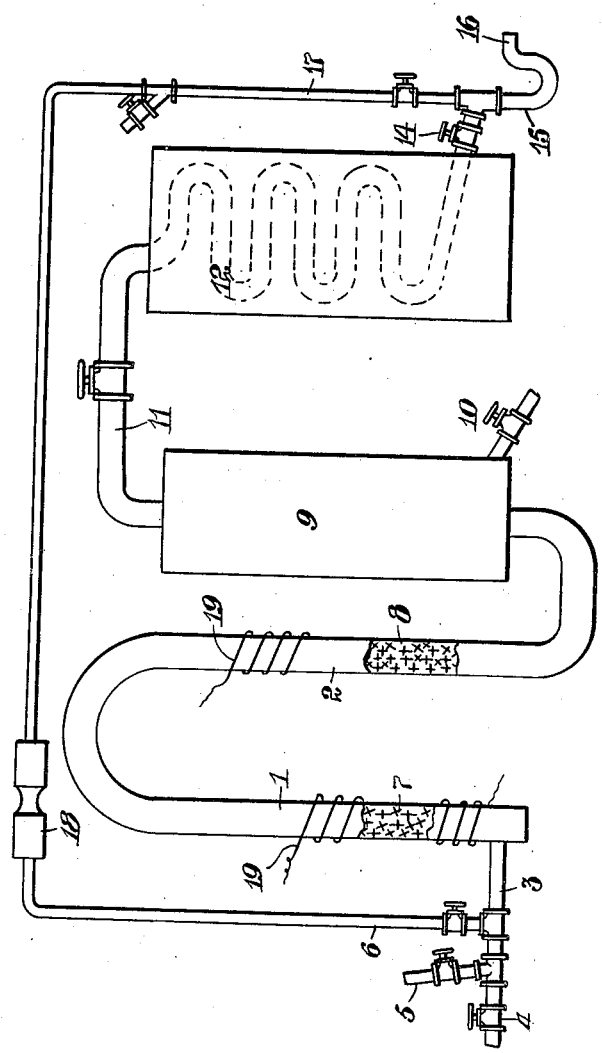
Attest:
Inventor:

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

MAKING GAS-OIL.

1,341,975.  Specification of Letters Patent.  Patented June 1, 1920.

Application filed May 29, 1913. Serial No. 770,696.

*To all whom it may concern:*

Be it known that I, CARLETON ELLIS, a citizen of the United States, and a resident of Montclair, in the county of Essex and State of New Jersey, have invented certain new and useful Improvements in Making Gas-Oil, of which the following is a specification.

This invention relates to a process of making gas oil and the like and other materials and to the products of such process and relates in particular to the heat treatment of petroleum oil such as kerosene oil and similar oils whereby decomposition of the same is effected under differing and well regulated conditions affording useful products.

Large quantities of gas oil are used in the production of illuminating gas from water gas and as the production of this grade of oil is limited to the amount produced during the usual processes of distillation, the demand is tending to exceed or has substantially exceeded the supply.

The present invention also enables the production of gas oil or allied material from lighter oil such as kerosene.

The distillate known as gas oil has a gravity of about 34–36° Bé., while that of kerosene is approximately 42° Bé. By heating kerosene under certain controllable conditions as will be hereinafter more particularly indicated and especially by heating in the presence of catalyzers, the kerosene is decomposed producing substantially three products, namely, gas oil; gasolene and gaseous bodies. The gaseous products to a considerable extent represent waste as the gas usually is of utility only for heating purposes at the point of production and the use of fuel of this character is, usually, relatively costly.

By the present invention the production of gaseous bodies while transforming say kerosene substantially into gas oil and lighter materials as gasolene is minimized while any gas which may be evolved during the process is in part at least preferably utilized in saturating more or less the unsaturated decomposition products which are formed.

The decomposition of kerosene when exposed to relatively high temperatures gives rise to the production of unsaturated hydrocarbons such as the olefins which give the products a disagreeable odor and oftentimes a dark color. The treatment of the resulting product with sulfuric acid and alkali as is customary in the art, causes a considerable loss as the sulfuric acid combines with the saturated bodies and they are removed as products of little value. Utilization to some extent of the gases generated during the process enables the production of more nearly saturated compounds and therefore the refining loss is lowered or, under favorable conditions, is often inconsiderable.

Such saturating effect may be in a measure secured by certain catalytic bodies and in the present invention gas-occluding metal catalysts of the nature of copper and nickel are preferred. The raw material is preferably first exposed to highly heated surfaces of iron or steel and after decomposition has proceeded to a certain extent, the products of decomposition are preferably contacted with catalytic surfaces such as fragments of, or finely divided copper, nickel or cobalt. A raw material such as kerosene may be passed in the form of a vapor through a heat zone preferably in such a manner that the vapors are subjected to a gradually increasing temperature until the maximum temperature of decomposition is reached, the vapors during this step of the process being super-heated and the zone in which the more important reactions of decomposition take place being maintained at a temperature preferably between 450–600° C.

It is important to carefully regulate the velocity of the vapors through said heat zone in order to carry out the present invention in its preferred form. The transformation of kerosene of 42° Bé. into gas oil of say 36° Bé. and gasolene of say 55° Bé. is effective only under conditions which permit of careful regulation and control of the temperature of the vapors and their velocity of travel, that is to say, the time contact or time factor. Another factor of considerable importance is the differential temperature by which I mean the temperature of the vapors at any given point and the average temperature of the heated walls or masses with which they contact.

For best results it is desirable to not merely provide a heating zone which raises the temperature of the vapors to a certain point, but to effect such a differential in temperature between the vapors and the heated surfaces that the reactions of decomposition proceed effectively along the lines mentioned. These reactions are best carried out when the velocity of travel is adjusted to give a differential of temperature of about 100° C.; that is to say, the temperature of the vapors at any given point should be about 100° C. less than the average temperature of the heated surfaces with which they contact. This means applying an external heat considerably greater than the temperature of the contacting surfaces as much heat is absorbed during the decomposition, the vapors being increased in volume by the formation of molecules of lesser molecular weight.

By way of illustration it may be stated that with an apparatus consisting of metal tubes externally heated and in part filled with irregular fragments of iron, in part with fragments of nickel or cobalt, and employing as a raw material kerosene oil of a gravity of 42° Bé., I prefer to cause the oil vapors to pass through the heating system at a rate such that in a preliminary section filled with iron fragments, a temperature of about 475° C. in maintained; and in a second section (in series) containing nickel or cobalt, a temperature of about 500° C. preferably exists. The adjustment of the temperature differential is thus secured by regulating the rate of flow of the vapors.

Kerosene of 42° Bé. is passed through aforesaid apparatus giving a yield of 40% gasolene and 40% of gas oil, etc. The rate of flow through a three inch tube packed in the catalytic material is approximately one gallon in ten minutes.

The treatment of the kerosene vapors adjusted to the 100° temperature differential aforesaid gives a yield of approximately equal volumes of gasolene boiling up to 150° C. and gas oil, the latter containing any kerosene which may have passed through the apparatus without decomposition. The vapors issuing from the apparatus are condensed if desired by dephlegmating so that the gas oil and gasolene are separately condensed.

A suitable material for filling the heating tubes is ordinary metal jackstones which, in the first secetion above referred to, may be of plain iron; while in the second section it may be of iron plated with nickel.

The drawings show in vertical elevation with parts thereof in section an organization of apparatus adapted for the carrying out of the process herein. In these diagrammatic drawings 1 is an upright tube connecting with the second tube 2. Tubes 1 and 2 may be suitably heated as by means of electric wires 19, the current passing through the wire about tube 2 preferably being such as to maintain such tube at a temperature in excess of the temperature maintained in tube 1 by the current in the wire about such tube. 3 is an inlet pipe for oil vapors, steam and gases and the entrance of oil vapors is regulated by the valve 4. 5 is a valve controlled pipe for the admission of steam and 6 is a similar pipe for the admission of gases of reaction. In the tube 1 are masses of jack stones shown at 7, these preferably are plain iron. The tube 2 also shows jack stones at 8, these preferably being nickel plated. 9 is a dephlegmator having oulet 10 for heavy products and a pipe 11 for the volatile or gaseous portions of the reaction material. 12 is a condenser having a valve controlled outlet 14, trap 15 and discharge outlet 16. A valve controlled pipe 17 serves to collect the gases of reaction. This pipe extends and connects with the pipe 6.

In the operation of the process employing this illustrative apparatus, oil vapors under a pressure of several atmospheres are forced into the heated tube 1 and mingle with the catalytic material passing upwardly through this tube and downwardly through the tube 2 through additional catalytic material. Reaction takes place and the products of the reaction pass to the dephlegmator 9 where the heavy portions are collected and the lighter portions passed to the condenser 12. Some portion of the vapors are withdrawn in a liquid condition from the condenser while a portion at least of the gases is carried back to the inlet pipe 3. By means of a suitable pump 18 the proportion of reaction gases and steam with respect to the amount of oil vapors is regulated by the several valves as shown.

The foregoing temperatures may be varied more or less when oils of differing chemical characters are employed and kerosene oils even though of the same specific gravity but obtained from different sources may require varying treatment which may be readily ascertained by varying the temperature under the foregoing conditions to secure the proper heating differential and velocity of travel whereby regulation and control of the reaction may be effected in accordance with the present invention with respect to any given sample of oil.

Thus some oils, decomposed effectively under a temperature differential of 100° C. in the presence of an iron and nickel catalyzer in series, may require a higher or lower differential temperature when the catalyzer is iron and copper or iron and cobalt or other contacting material.

Preferably the treatment is carried out under pressure as this increase in pressure tends to reduce the formation of gas and the tubular system preferably employed enables pressures of 5 or 10 atmospheres (higher or lower) to be employed without danger. The condensation of the vapors may, if desired, take place under pressure. Preferably, however, the vapors are not immediately condensed, but are allowed to cool slowly until the reactions of decomposition are substantially complete when they are conducted to a condenser where if desired, the pressure may be reduced to substantially zero.

If desired, the vapors of the kerosene oil or other raw material may be mingled with steam while being passed through the decomposition zone, or preferably they are mingled with gases produced by any decomposition of a more advanced portion of the vapor-current as the presence of the gases of decomposition, especially when under pressure of several atmospheres, tend by mass action in many cases to depress those reactions which tend to form gaseous bodies and thus the course of the reactions is more nicely directed toward the production of the heavier and lighter condensable products from kerosene.

What I claim is:

1. The process of producing gas oil and other products from kerosene and the like which comprises subjecting the vapors of kerosene to a gradually increasing temperature between 450–600° C. in the presence of iron and nickel heated to a temperature substantially 100° C. higher than said vapors and in causing the vapor-current to travel through the heated zone whereby such temperature differential is maintained substantially throughout the length of travel thereof.

2. The process of producing gas oil and other products from kerosene and the like which comprises subjecting the vapors of kerosene to a temperature of 500° C. in the presence of iron and nickel heated to a temperature substantially 100° C. higher than said vapors and in causing the vapor-current to travel through the heated zone; whereby such temperature differential is maintained substantially throughout the length of travel thereof.

3. The process of producing gas oil and other products from kerosene and the like which comprises subjecting the vapors of kerosene to a temperature of at least 475° C. in the presence of iron and nickel heated to a temperature substantially 100° C. higher than said vapors and in causing the vapor-current to travel through the heated zone; whereby such temperature differential is maintained substantially throughout the length of travel thereof.

4. The process of producing gas oil and other products from kerosene and the like which comprises subjecting the vapors of kerosene to a temperature between 450–600° C. in the presence of iron and nickel heated to a temperature substantially 100° C. higher than said vapors and in causing the vapor-current to travel through the heated zone; whereby such temperature differential is maintained substantially throughout the length of travel thereof.

5. The process of producing gas oil and other products from kerosene and the like which comprises subjecting the vapors of kerosene to a temperature between 450–600° C. in the presence of iron and nickel heated to a temperature substantially higher than said vapors and in causing the vapor-current to travel through the heated zone; whereby such temperature differential is maintained substantially throughout the length of travel thereof.

6. The process of producing gas oil and other products from kerosene and the like which comprises subjecting the vapors of kerosene to a gradually increasing temperature between 450–600° C. in the presence of iron and nickel heated to a temperature at least 100° C. higher than said vapors and in causing the vapor-current to travel through the heated zone; whereby such temperature differential is maintained substantially throughout the length of travel thereof.

7. The process of forming lighter and heavier bodies from kerosene which comprises subjecting the vapors of kerosene to a decomposing temperature, in contacting same with heated catalytic material maintained at a temperature about 100° C. above that of the temperature of the vapors of said kerosene, in causing said vapors to travel as a current through the contact material comprising iron and another contact metal in series; whereby condensable products both lighter and heavier than kerosene are formed, and in separating the lighter from the heavier products.

8. The process of forming lighter and heavier bodies from kerosene which comprises subjecting the vapors of kerosene under pressure to a decomposing temperature, in contacting same with heated catalytic material maintained at a temperature about 100° C. above that of the temperature of the vapors of said kerosene, in causing said vapors to travel as a current through the contact material comprising iron and another contact metal in series; whereby condensable products both lighter and heavier than kerosene are formed, and in separating the lighter from the heavier products.

9. The process of producing lighter and heavier bodies from kerosene which consists in subjecting the vapors of kerosene under pressure to a decomposing temperature, removing from the products of decomposition the heavier bodies present therein and heating kerosene vapors to a decomposing temperature in contact with the remaining lighter bodies whereby such lighter bodies by mass action increase the yield of heavier and lighter bodies from the kerosene.

10. The process of producing lighter and heavier bodies from kerosene which consists in subjecting the vapors of kerosene under pressure to a decomposing temperature, removing from the products of decomposition the condensable portion thereof and heating the vapors of kerosene to a decomposing temperature in contact with the uncondensed portion of the decomposition products.

11. The process of making gasolene-like material which comprises mixing petroleum vapors and gaseous petroleum decomposition products and subjecting the mixture under a pressure of several atmospheres to a decomposition temperature whereby the said petroleum decomposition products by mass action increase the yield of heavier and lighter products from the petroleum vapors under treatment.

Signed at Montclair, in the county of Essex and State of New Jersey, this 22nd day of May, A. D. 1913.

CARLETON ELLIS.

Witnesses:
B. M. ELLIS,
F. CAUBUTT.